July 31, 1962  J. H. MELZER  3,046,638
METHOD OF PRODUCING HOLLOW SHEET-METAL PANEL STRUCTURES
Filed Feb. 11, 1959  4 Sheets-Sheet 1
FIG. 4
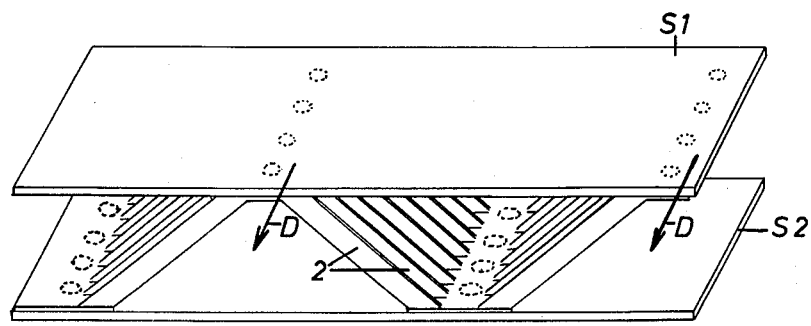
FIG. 2
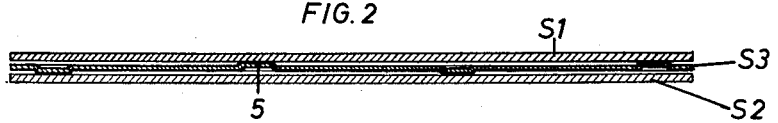
FIG. 1a
FIG. 1
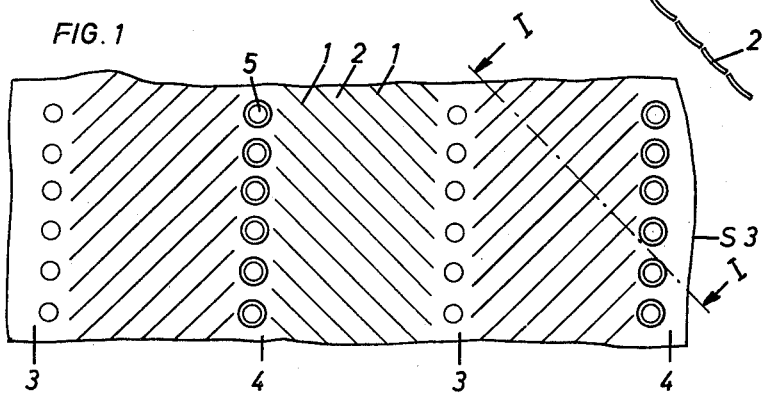
FIG. 3
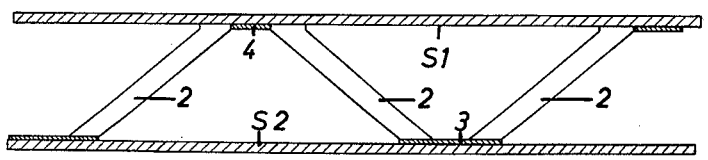

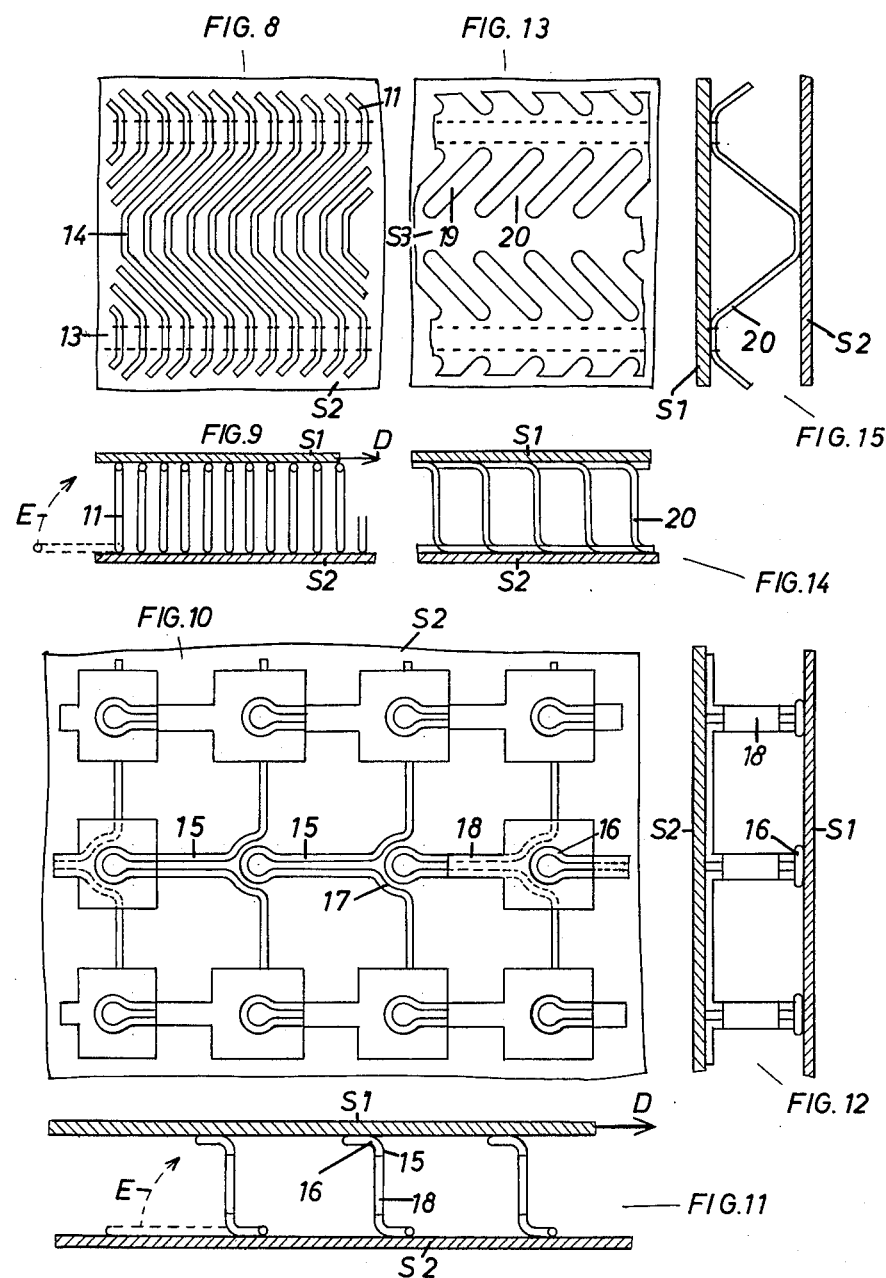

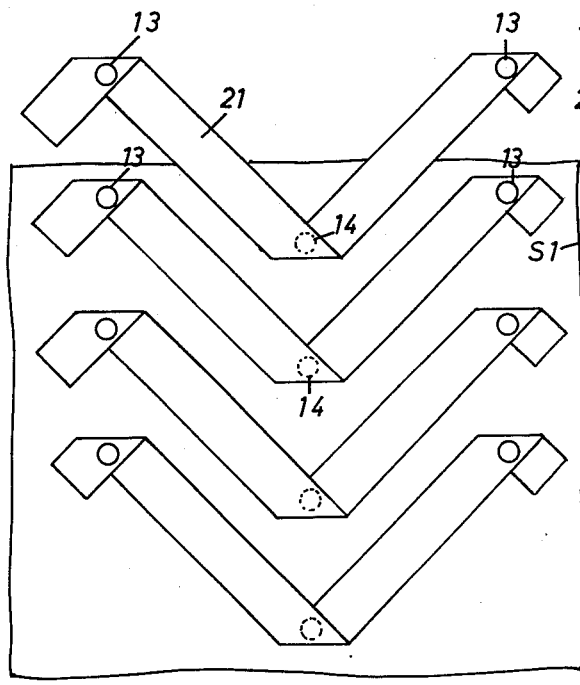
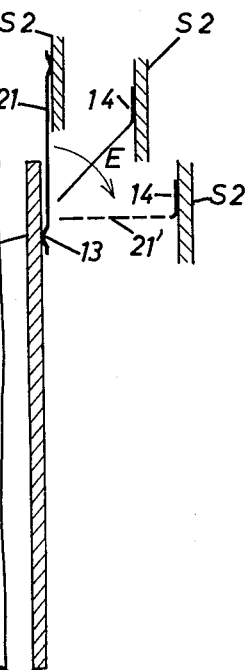
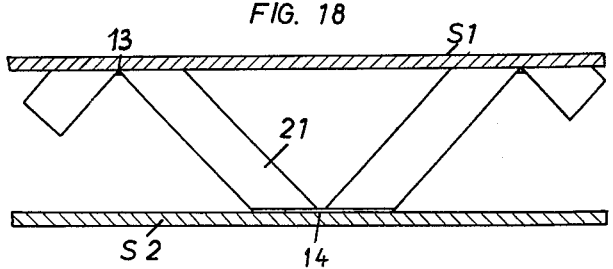

United States Patent Office 3,046,638
Patented July 31, 1962

3,046,638
METHOD OF PRODUCING HOLLOW SHEET-METAL PANEL STRUCTURES
Jean H. Melzer, Vogler Str. 36, Weinheim an der Bergstrasse, Germany
Filed Feb. 11, 1959, Ser. No. 792,522
Claims priority, application Germany Feb. 17, 1958
5 Claims. (Cl. 29—155)

My invention relates to the manufacture of hollow sheet-metal structures generally of the sandwich type and has for its object to make sheet-metal products, applicable for the construction of floors, walls, roofs, partitions, bulkheads and other large-area structures, that combine light weight and great rigidity and strength with the advantage of being more cheaply producible than the hollow sheet-metal structure heretofore available.

Hollow structures of the above-mentioned type comprise two skin sheets which are kept separate from each other by a shear-resistant core structure. As a rule, such hollow structures have heretofore been produced by fastening the two skin sheets to a previously completed core structure. According to the method disclosed in my copending application Serial No. 658,709 filed May 13, 1957, now Pat. No. 3,000,088, a similar sandwich structure is produced by placing a planar lattice sheet between two skin sheets, then welding the lattice sheet at selected points to the two skin sheets, and thereafter expanding the structure by applying fluid pressure between the two skin sheets.

My present invention is similar to the one disclosed in my above-mentioned application in that the two skin sheets are first assembled in flat condition with an intermediate lattice structure and are then separated from each other. However, it is another object of my present invention to simplify the production of such hollow structures and to reduce the manufacturing cost.

To this end, and in accordance with a feature of my invention, the intermediate lattice structure, placed flat between two skin sheets before being joined at selected points with the respective skin sheets, is made up of an assembly of struts so oriented that they all have the same direction of erection relative to the two skin sheets. After such a lattice assembly is placed between two skin sheets and welded or otherwise bonded together therewith, the hollow sheet-metal structure is produced simply by forcing one skin sheet relative to the other in the direction of erection common to the struts.

The material for very many individual struts, such as 1000 or more per square meter, can be prepared in a simple manner and can be placed between the two skin sheets as a single unit, before being joined with the two skin sheets, each individual strut having its head point joined with one sheet and its foot point joined with the other sheet.

The erection of the struts may be performed in a single operating step by applying upon one of the skin sheets a force in a direction parallel to the plane of the sheet and coincident with the common erection direction of all struts. If desired, however, an auxiliary fluid pressure may be applied simultaneously between the two skin sheets substantially in the manner explained in my above-mentioned co-pending application, but the application of such pressure is not necessary in most cases, and the pressure requirements, in any event, are very greatly reduced.

The invention will be further described with reference to the embodiments shown by way of example on the accompanying drawings in which:

FIG. 1 illustrates a punched metal sheet that is to form the interior portion of a hollow sandwich structure to be produced, FIG. 1a shows schematically a cross section along the line I—I indicated in FIG. 1, FIG. 2 is a cross sectional view of a sandwich assembly comprising a core sheet according to FIG. 1, FIG. 3 shows schematically a cross section of the completed hollow structure, and FIG. 4 is a schematic, perspective view of the same structure.

FIG. 8 illustrates a core or lattice structure composed of individual wire members, and FIG. 9 is a schematic cross sectional view of a hollow structure made with such a wire lattice.

FIG. 10 is a top view on a portion of still another lattice structure made of wire members still in planar condition, FIG. 11 is a longitudinal section of a hollow sandwich structure made with such a lattice, and FIG. 12 is a transversal cross section of the same structure.

FIG. 13 illustrates a punched lattice sheet of a design different from that of FIG. 1, FIG. 14 shows schematically a longitudinal section of a hollow structure made with a lattice sheet according to FIG. 13, and FIG. 15 is a transverse cross section of the same structure.

FIG. 16 shows a number of meander-shaped strips to serve as a core lattice, FIG. 17 illustrates schematically the operation that converts a sandwich assembly with such strips into the desired hollow structure, and FIG. 18 is a cross section through a structure made in this manner.

Figure 7:
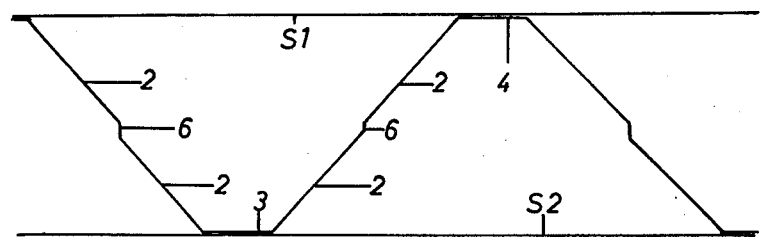
FIG. 7 shows schematically a cross section of a hollow structure made with a core sheet according to FIGS. 5 and 6.

According to FIG. 1, a metal sheet S3, which is to form the struts of a sandwich structure, is provided with a number of punched-out cuts 1 arranged in fish-bone fashion, the individual cuts being separated by strips 2 which subsequently form the individual spacer struts of the sandwich structure. If desired, the struts 2 may be reinforced by giving them a slightly curved cross section, for example by pressing, thus imparting to them a higher resistance to bending. Such a curved design is apparent from the cross section shown in FIG. 1a. Each row of cuts 1 according to FIG. 1 is spaced from the adjacent row by a strip area 3 or 4. These areas are provided with punched bosses 5 or the like protuberances. The bosses 5 in strip areas 4 are all on one side of the sheet S3. The bosses in the areas 3 protrude from the other side of the sheet.

The intermediate sheet S3, thus prepared, is placed between two contiguous skin sheets S1 and S2 as shown in FIG. 2, so that the bosses 5 on the top of the sheet S3 are in contact with the top sheet S1, while the bosses 5 on the bottom side of sheet S3 are in contact with the bottom sheet S2. The bosses 5 are subsequently welded together with the respective skin sheets S1 and S2. The welding is done by spot welding. Due to the bosses, no particular care when placing the welding electrodes onto the sheets is required to make certain that welding takes place only at the top of the individual bosses.

Thereafter, the skin sheet S1 is forced to move relative to skin sheet S2 in the direction indicated by arrows D in FIG. 4. Since the orientation of all struts 2 is such that all of them can be bendingly erected in the same direction, namely that of the arrows D, the just-mentioned application of force has the effect of moving the skin sheet S1 away from skin sheet S2 and placing the individual struts into upright position. During this operation, all points of skin sheet S1 move on a quarter cycle relative to their original position until the struts 2 are all located substantially in planes that are normal to the direction D. The just-mentioned motion on a quarter circle due to force in the direction D is indicated by the arrow 11 in FIGS. 9 and 11.

When the struts are thus erected into planes normal to the skin sheets, the interior of the sandwich structure obtains maximum volume and maximum carrying ability.

Figure 5:
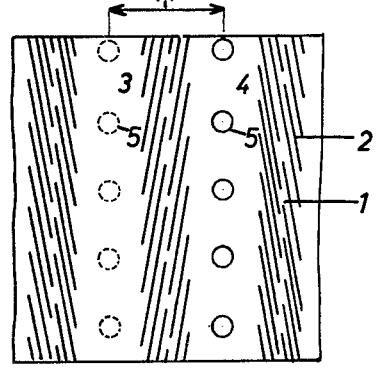
FIG. 5 shows another punched core sheet, FIG. 6 the same sheet after it has been longitudinally expanded while still in planar shape.

The method and structure illustrated in FIGS. 5 and 7 is particularly favorable in cases where it is desired to reduce the number of struts and their cross section for minimizing the weight of the structure or for reducing the heat conductance in the completed hollow structure transverse to the planes of the skin sheets. According to FIG. 5 the cuts 1 between the remaining foot-strip areas 3 and top-strip areas 4 are so made that, after punching the lattice sheet, it can be pulled apart to the width shown in FIG. 6. In this manner, the original center spacing A between adjacent strip areas 3 and 4 is expanded to the spacing B. By virtue of the particular pattern of the fishbone cuts shown in FIG. 5 there remain intermediate bridges 6 which make the individual struts more resistant to bending.

Figure 6:
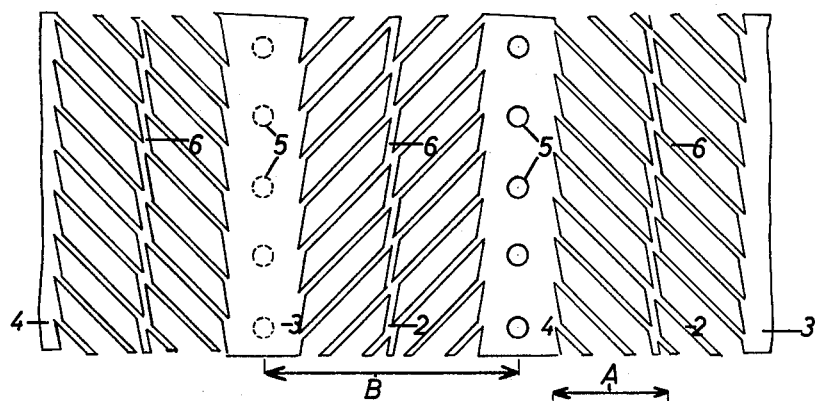

The lattice sheet, in the expanded condition shown in FIG. 6 but still in planar shape, is sandwiched and welded between the two skin sheets in the same manner as described above. The finished hollow structure, after complete erection of the struts 2, is schematically illustrated in FIG. 7.

In the embodiment shown in FIGS. 8 and 9, the lattice is formed of an array of wave-shaped wires 11, which are held together to form a web or mat by means of varnish or resinous adhesive sprayed onto the wires. The above-mentioned foot-strip areas and top-strip areas are constituted by the zones denoted in FIG. 8 by 13 and 14 respectively, these zones representing the areas in which the individual wires are to be welded to the upper and lower skin sheets. The welding of the wires alternately to only one of the two skin sheets can be facilitated by inserting a copper-foil strip between the wire and the skin sheet on the side not to be welded.

After welding the wire assembly and the two skin sheets together, the skin sheets S1 and S2 are separated from each other by applying a pulling force in the direction of the arrow D with the result that the individual wire portions are turned along a quarter circle, identified by the arrow E, from the original position shown in broken lines at 11′ to the position indicated by 11 in FIG. 9.

In the embodiment shown in FIGS. 10, 11 and 12, the intermediate strut assembly is formed by a lattice arrangement of wires which have respective loop portions 15 to form the individual struts. The wire members are held together by foil strips 18. The foil is inserted between the foot portion 16 of one wire and the head portion 17 of the adjacent wire. At the locations 18 the foil is bent around the wire loop. In this manner, the foot and head portions of the individual struts are prepared for being selectively welded to the top sheet S1 and the bottom sheet S2. During welding operation the lattice assembly lies flat between the two skin sheets. When the welding is completed, the two skin sheets are separated from each other as indicated by the arrows D and E in FIG. 11, the ultimate relative position of the skin sheets and the shape of the finished struts being apparent from FIGS. 11 and 12.

According to FIG. 13, a material for the strut assembly similar to that used in the embodiment of FIGS. 8 and 9, is obtained by stamping relatively wide slots 19 into a metal sheet; the remaining struts 20 are to be welded to the skin sheets S1, S2 in the manner described above. The completed hollow structure is apparent from FIGS. 14 and 15.

According to FIG. 16, the strut assembly is formed by a number of sheet metal strips 21 each folded to meander shape. The strips are placed between two skin sheets S1, S2 and welded together therewith at the respective foot points 13 and head points 14. Thereafter the skin sheet S2 is forced away from the skin sheet S1 as indicated in FIG. 17 by the arrow E. During this operation the skin sheet S2 passes through the illustrated intermediate position to the final position. The final position of a spacer strut is schematically indicated by a broken line at 21′. The final shape of the sandwich assembly is apparent from FIG. 18.

The above-described method of separating the two skin sheets after they are welded together with the intermediate lattice structure of struts, can be performed simply by imposing a tangential force upon one of the skin sheets while the other is being retained in the original position. This force can be applied as a pulling or pushing force upon the edges of the skin sheet S1. When producing planar sandwich structures no other devices than those required for retaining one skin sheet and imposing force upon the other are required. If desired, however, auxiliary devices may be used for keeping the sheets in proper position or in planar shape. For example electromagnetic supporting or abutment plates may thus be employed. If the sheets are non-magnetic, they may be held in position by means of suction gratings or suction boxes. Instead, compressed air may be applied by means of a blower, between the two skin sheets as the sheets are being separated from each other. The two sheets may also be kept between planar plates which, during the operation that causes erection of the struts, are gradually moved away from each other while gas or liquid pressure is applied between the two skin sheets in the manner described in my copending application Serial No. 658,709.

When fabricating very thin sheets in accordance with the invention, it is preferable to use clamping devices or jigs which during welding operation, prevent distortion of the sheets by thermal tension.

When producing a hollow sheet-metal structure with planar and parallel skin sheets, all struts have the same length. The invention may also be employed for producing hollow structures of non-uniform thickness or of curved shape, in which cases the length of the respective struts may be made different at different localities in accordance with the desired final shape of the hollow structure.

I claim:

1. The method of producing a hollow sheet-metal panel structure from two skin sheets and intermediate struts, which comprises placing a lattice of mutually spaced strut means face-to-face upon one of the skin sheets and placing the other skin sheet face-to-face upon the lattice, permanently joining said lattice on one end of the struts with only one of said skin sheets and at the other end of the struts with the other skin sheet, said struts having a given direction of erection in common relative to said skin sheets, and thereafter forcing the two skin sheets in said direction and away from each other along an arcuate path of mutual separation to cause permanent deformation of the struts until each strut extends between said two skin sheets substantially in a plane normal to each sheet.

2. The method of producing a hollow sheet-metal panel structure from two skin sheets and intermediate structs, which comprises placing a lattice of mutually spaced strut means face-to-face upon one of the skin sheets and placing the other skin sheet face-to-face upon the lattice, permanently joining said lattice on one end of the struts with only one of said skin sheets and at the other end of the struts with the other skin sheet, said struts having a given direction of erection in common relative to said skin sheets, and thereafter applying displacing force to one of said skin sheets relative to the other in said direction, whereby all points of said one sheet move substantially on a quarter circle relative to its starting position until the struts are erected to a position substantially normal to the pulling direction.

3. The method according to claim 1, wherein said lattice is formed of a multiplicity of individual wire members.

4. The method according to claim 1, wherein said strut lattice is produced from a metal sheet by punching rows of mutually inclined slots in fish-bone pattern into the sheet, and joining the punched sheet with said skin sheets in the contiguous areas remaining between said rows.

5. The method according to claim 4 wherein the strut-forming material remaining between mutually adjacent slots of said rows are deformed to a non-planar cross section prior to joining the punched sheet with said skin sheets.

References Cited in the file of this patent
UNITED STATES PATENTS

| | | |
|---|---|---|
| 843,726 | White | Feb. 12, 1907 |
| 866,140 | Kahn | Sept. 17, 1907 |
| 880,820 | Pierson | Mar. 3, 1908 |
| 1,762,112 | White | June 3, 1930 |
| 2,141,642 | Cross | Dec. 27, 1938 |
| 2,256,812 | Miller | Sept. 23, 1942 |
| 2,481,046 | Scurlock | Sept. 6, 1949 |
| 2,746,139 | Pappelendam | May 22, 1956 |
| 2,778,458 | Briggs | Jan. 22, 1957 |
| 2,878,560 | Gier | Mar. 24, 1959 |